United States Patent [19]

Hadden

[11] Patent Number: 4,531,547

[45] Date of Patent: Jul. 30, 1985

[54] MINIATURIZED VALVE

[76] Inventor: Edward H. Hadden, 12 Laurel Dr., Granby, Conn. 06035

[21] Appl. No.: 458,633

[22] Filed: Jan. 17, 1983

[51] Int. Cl.³ .................... F15B 13/043; F15B 13/042
[52] U.S. Cl. ........................... 137/625.64; 137/625.6; 137/625.65
[58] Field of Search ........... 137/625.6, 625.64, 625.65, 137/625.27

[56] References Cited

U.S. PATENT DOCUMENTS

| | | | |
|---|---|---|---|
| 2,587,357 | 2/1952 | McPherson | 137/625.64 |
| 2,645,451 | 7/1953 | Gladden | 137/625.27 X |
| 3,016,065 | 1/1962 | Stampfli | 137/625.64 |
| 3,084,676 | 4/1963 | Herion | 137/625.64 X |
| 3,458,769 | 7/1969 | Stampfli | 137/625.64 X |
| 3,519,022 | 7/1970 | Chung et al. | 137/625.64 |
| 3,807,448 | 4/1974 | Hadden | 137/626.6 X |
| 3,814,132 | 6/1974 | Greenwood et al. | 137/625.64 |
| 4,212,320 | 7/1980 | Stoll et al. | 137/625.6 |

FOREIGN PATENT DOCUMENTS

| | | | |
|---|---|---|---|
| 2227778 | 12/1973 | Fed. Rep. of Germany | 137/625.6 |
| 536656 | 12/1955 | Italy | 137/625.64 |
| 355995 | 9/1961 | Switzerland | 137/625.64 |
| 1228782 | 4/1971 | United Kingdom | 137/625.64 |

Primary Examiner—Gerald A. Michalsky

[57] ABSTRACT

Miniaturized valves having fast response time and characterized by low power requirements and minimal fluid consumption. A main valve member, which is movable and determines the state of the valve, is responsive to the state of a control member which may be a solenoid operated pilot valve.

7 Claims, 4 Drawing Figures

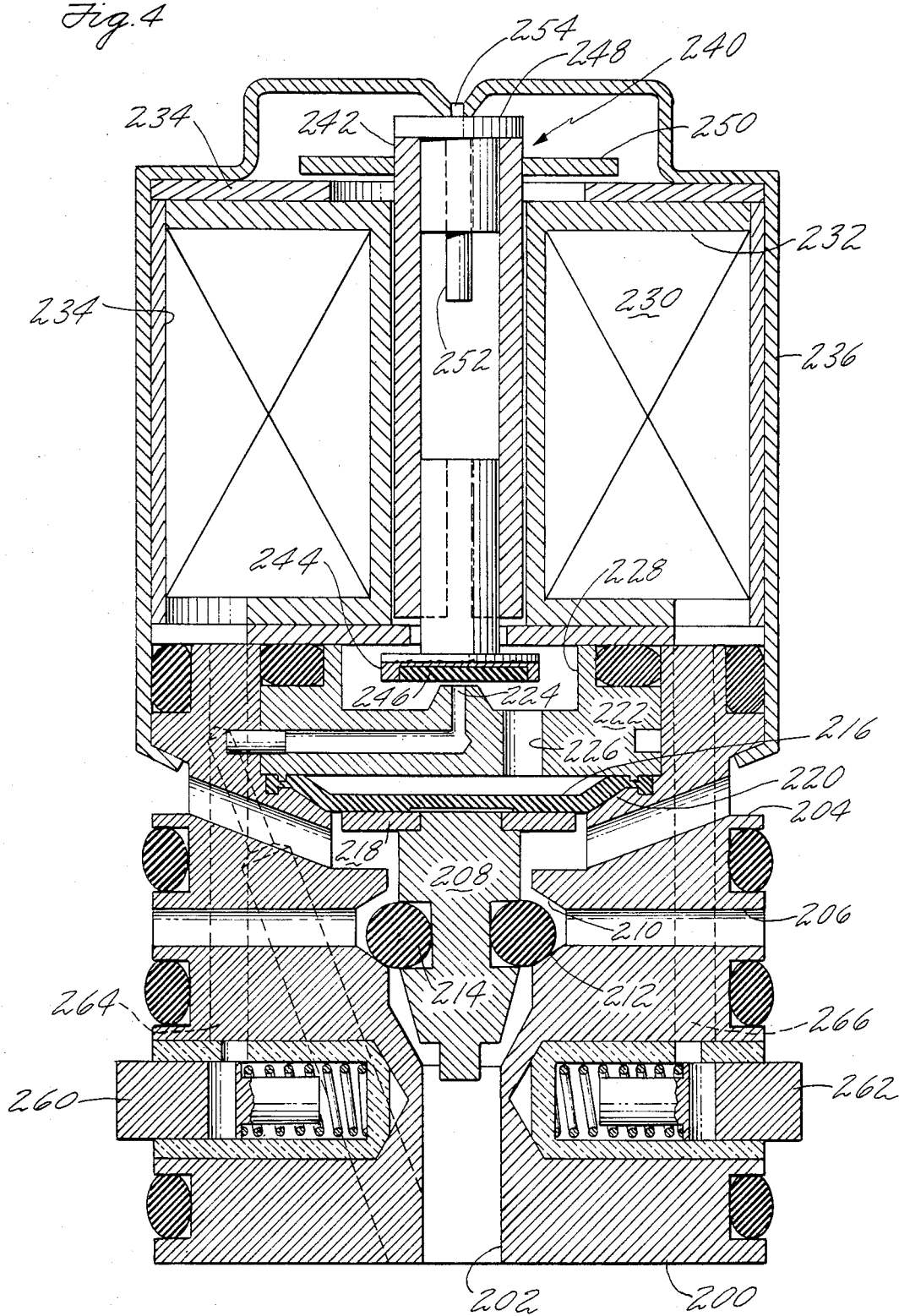

MINIATURIZED VALVE

BACKGROUND OF THE INVENTION

(1) Field of the Invention

The present invention relates to miniaturized valves and particularly to such valves which have a fast response time and very low power consumption. More specifically, this invention is directed to exercise of control over the flow of fluids and especially to controlling fluid flow directly from the output of solid state electronic circuitry. Accordingly, the general objects of the present invention are to provide novel and improved apparatus and methods of such character.

(2) Description of the Prior Art

Advances in fluid handling devices have not kept pace with advances in micro-electronics. Accordingly, there is a long-standing desire for a reliable, comparatively inexpensive miniature control valve which has a fast response time. Since control applications generally require that such a valve be used in conjunction with a piston-type actuator, such valves should preferably be of the three-way type. In addition, in order to permit such valves to be mounted directly on circuit boards, and thus operated directly by the micro-electronics, the desired compatible valve must be characterized by very low electrical power requirements.

The typical prior art approach to control valve miniaturization has been simply to attempt to scale down existing valves. These attempts to reduce valve size, however, have been largely unsuccessful and the devices resulting therefrom have been characterized by slow response time and/or unduly high electrical power requirements and/or a high rate of fluid consumption.

A major disadvantage of prior art miniaturized valves resides in the need to constantly bleed fluid when one of the fluid passage-ways controlled by the main valve member is in the closed condition. If the fluid which is employed is contaminated with dirt, this constant bleeding may lead to a clogging of passage-ways which, as the valve becomes physically smaller, become more susceptible to such clogging. Further, miniaturized valves are often used to regulate the flow of expensive fluids such as oxygen and the constant bleeding of the fluid is thus expensive and can, with a flamable fluid, be dangerous.

SUMMARY OF THE INVENTION

The present invention overcomes the above-discussed and other deficiencies and disadvantages of the prior art by providing a novel and improved miniaturized valve.

A valve in accordance with the present invention defines three main fluid flow paths and has two flow modes. The inlet to a first of these paths is permanently connected to a source of a pressurized operating fluid. A second path, which is controllably interrupted or opened by a main valve member, establishes fluid communication between a two-way port and a discharge port. When this second flow path is in the interrupted state, communication is established between the two-way port and the source of pressurized operating fluid. The third path, which is also controllably established or interrupted, directs the pressurized operating fluid to the first side of a power diaphragm disposed in a chamber formed within the valve housing. The power diaphragm functions as the actuator for the main valve member which controls the state of the second fluid flow path.

In accordance with a preferred embodiment the power diaphragm drives a valve spool, which comprises the main valve member, between opposite limits wherein seals carried by the spool are seated against cooperating valve seats. Thus, in a first mode of pressurization of the power diaphragm communication will be established between the source of operating fluid and the two-way port and the second fluid path will be in the interrupted state. In the second mode of pressurization of the power diaphragm the two-way port will be isolated from the source of operating fluid and communication will be established between the two-way port and the discharge port. It is to be noted that the power diaphragm functions as a differential area piston.

Also in accordance with the preferred embodiment, the means for controlling the state of the third flow path is a solenoid operated valve assembly which is mounted within a separate housing which may be mated with the housing of the three-way valve. Alternatively, this pilot valve subassembly may be in the form of a fluidic actuator. In either event, the state of the pilot valve determines the state of actuation of the power diaphragm. A principal advantage of the present invention resides in the fact that only a minute volume, substantially the volume of the chamber behind the power diaphragm, is vented when the valve is switched from one state to the other. Thus, when the pressurization of the chamber behind the power diaphragm is terminated, through operation of the pilot valve, the operating fluid will act on the main valve spool thus switching the valve and moving the diaphragm in the chamber. This movement is permitted because the closing of the pilot valve will establish a vent path, through the pilot valve housing, to the ambient atmosphere.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and wherein:

FIG. 4 is a view similar to FIGS. 1 and 2 which depicts a solenoid operated valve in accordance with the preferred embodiment of the invention.

DESCRIPTION OF THE DISCLOSED EMBODIMENTS

Figure 1:
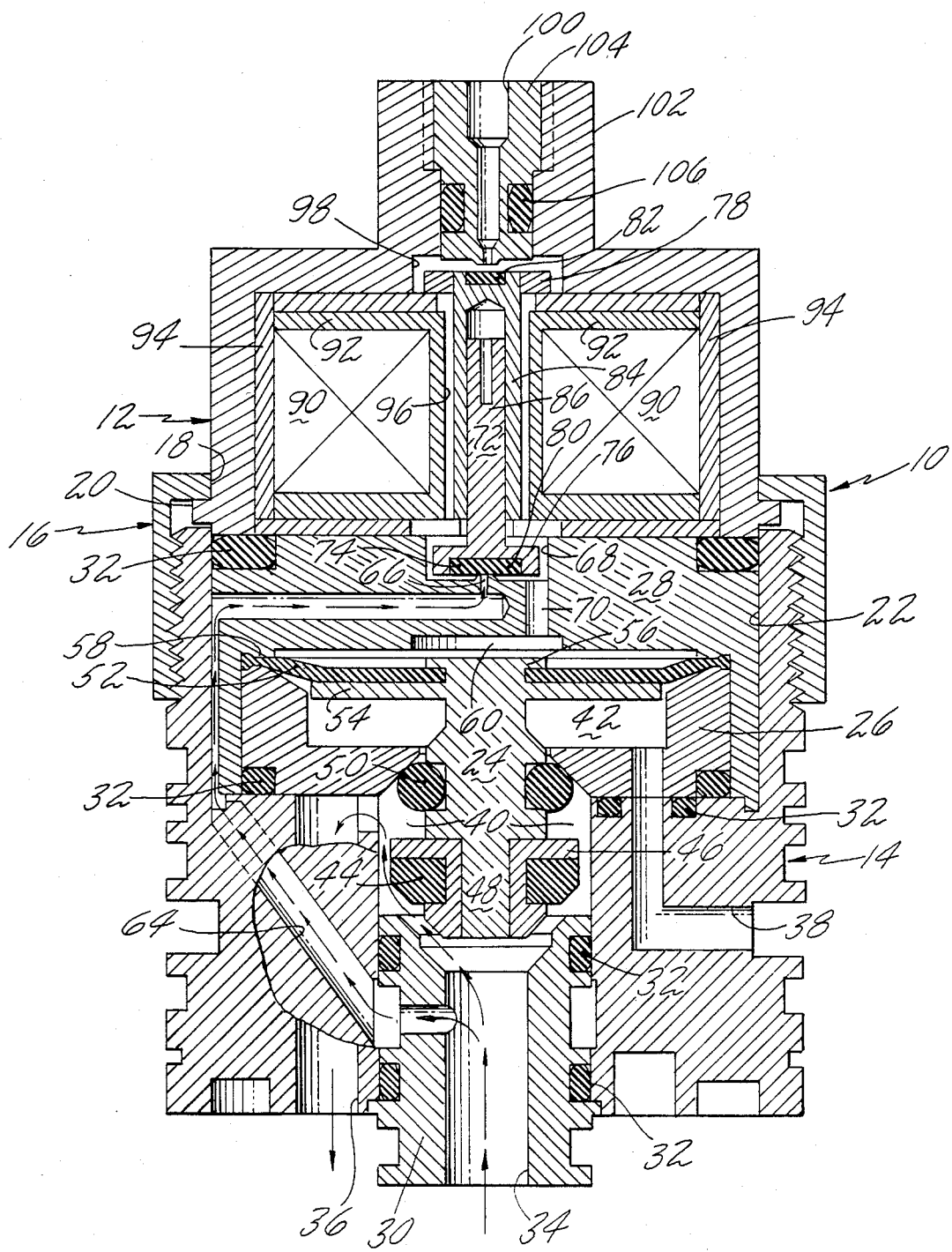
FIG. 1 is a cross-sectional side-elevation view of a miniaturized, three-way, solenoid operated valve in accordance with a first embodiment of the invention, the valve of FIG. 1 being shown in a first operating state.
Figure 2:
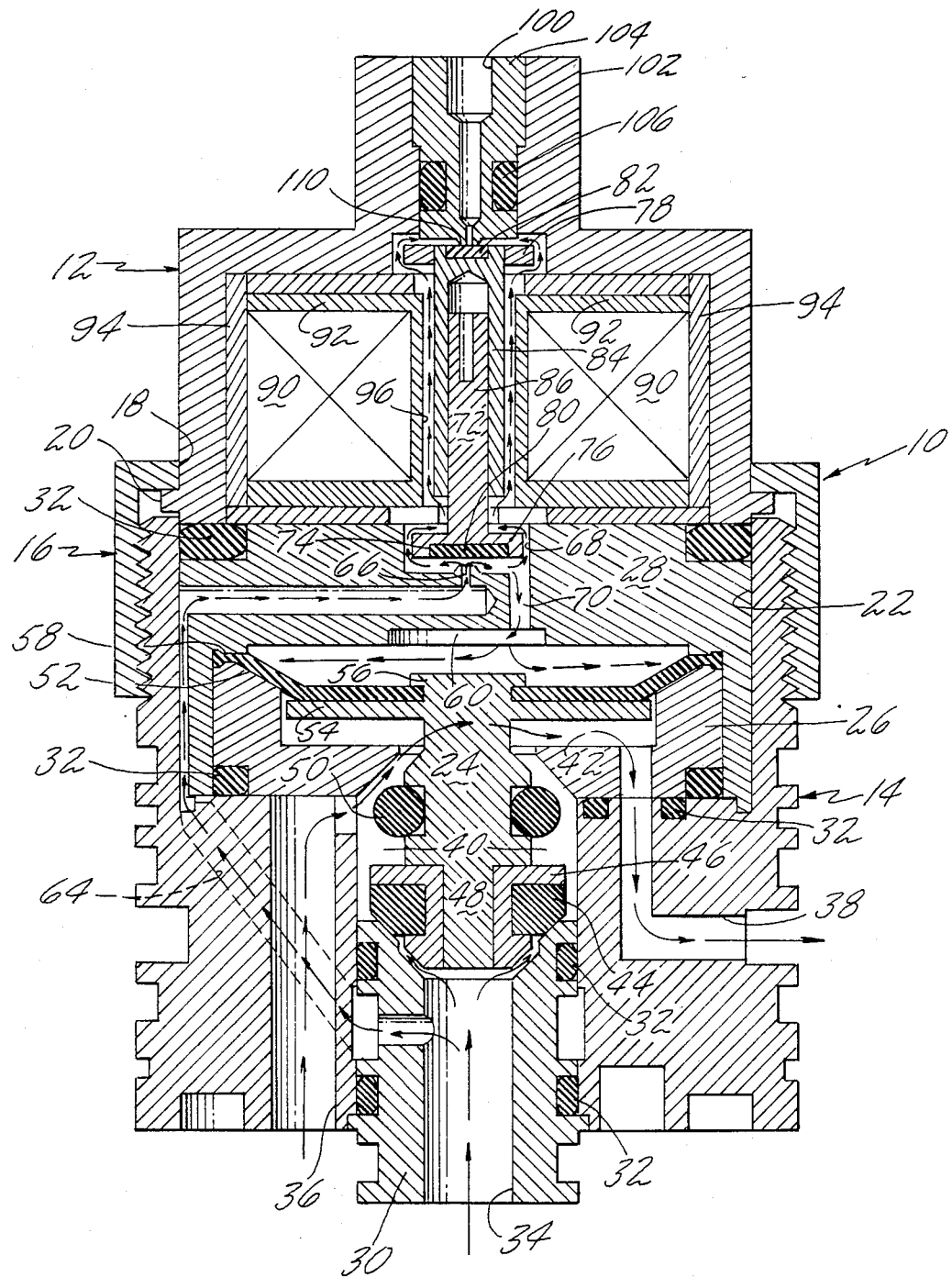
FIG. 2 is a view similar to FIG. 1 showing the valve in its second operating state.

Referring jointly to FIGS. 1 and 2, a valve in accordance with a first embodiment of the present invention is indicated generally at 10. All of the components of valve 10, unless otherwise specifically noted, may be comprised of anodized aluminum. The device of FIGS. 1 and 2 includes a valve subassembly, indicated generally at 14, and an actuator or pilot valve subassembly, indicated generally at 12. The actuator subassembly 12 is removably mounted on the valve subassembly 14 by means of a coupling nut which has been indicated generally at 16. Nut 16 has an internal thread which engages an external thread on the valve body 22. Nut 16 further has an inwardly extending flange 18 which engages an annular projection 20 on the housing of the actuator subassembly 12.

The valve subassembly 14 includes the valve body 22, a spool 24 and an insert 26 which, among other purposes, defines a first or upper valve seat. The insert 26 cooperates with a nozzle plate 28 to support a power diaphragm 52 and define a chamber 42 in which that diaphragm moves. The diaphragm 52 is connected to the spool 24 as will be described below. The valve subassembly further includes a coupling member 30 which is received in body 22, for example, by means of a press fit. Coupling 30 defines, at its upper end, a second or lower valve seat which cooperates with the spool 24. Leakage around the coupling 30 is prevented by means of sealing rings 32 positioned between coupling 30 and the wall of the aperture in valve body 22 which receives the coupling.

The coupling member 30 defines an inlet port 34 which is permanently connected to a source of pressurized operating fluid. The valve body 22 defines a two-way port 36 and a discharge port 38. With the valve in the position depicted in FIG. 1, wherein a pilot valve or actuator is in the energized state, the operating fluid will be delivered from port 34, through the valve seat at the upper end of coupling 30, through the chamber 40 in which the spool 24 moves to the passage which extends from the two-way port 36. The discharge port 38 will be in constant communication with the chamber 42. When the actuator is deenergized, the valve switches to the state shown in FIG. 2 and sealing ring 44, carried by a member 46 mounted on spool 24, will contact the seat defined by the upper end of coupling 30. Communication between inlet port 34 and chamber 40 will thus be interrupted. The seal carrying member 46 is press fit on an extension 48 of spool 24, this arrangement being in the interest of facilitating assembly of the valve. The second seal, in this case an O-ring 50, is mounted on spool 24 and cooperates with the upper valve seat defined by insert 26. Thus, with the valve in the state depicted in FIG. 1 the sealing ring 50 prevents fluid flow between two-way port 36 and discharge port 38 whereas, when the valve switches to the state shown in FIG. 2, fluid may flow between port 36 and port 38 through the valve defined by spool 24 and insert 26.

The position assumed by valve spool 24 within the chamber 40 is a function of the state of pressurization of a diaphragm 52. Diaphragm 52 is affixed, in any suitable manner, to a spider 54. Spider 54 may be in the form of an annular plate which extends outwardly in a transverse direction with respect to the axis of spool 24. The spider 54 cooperates with an integral flange 56 to define an annular groove which receives the inner edge of diaphragm 52. The outer periphery of diaphragm 52 is captured, with the aid of a projection 58, between nozzle plate 28 and insert 26. The diaphragm 52 thus divides the valve subassembly chamber 42, defined by nozzle plate 28 and insert 26, into an upper portion 60 and a lower portion. The lower portion of this chamber, as noted above, is in constant fluid communication with discharge port 38 and, with the valve in the state depicted in FIG. 2, also in communication with two-way port 36. The diaphragm 52 is effectively a differential area piston since the upper side thereof, as the device is shown in FIGS. 1 and 2, has a greater reaction surface area than the area of the lower side of spider 54. The spool 24 is caused to reciprocate, in the axial direction, by varying the pressure at the opposite sides of diaphragm 52 in the manner to be described below.

Operation of the main valve, i.e., the position of spool 24, is a function of whether the upper chamber portion 60 is in communication with port 34 or vented to the ambient atmosphere. Thus, the delivery of the pressurized operating fluid to upper chamber 60 results in the spool 24 moving to the position shown in FIG. 2 where two-way port 36 is isolated from port 34 but is in communication with port 38 via the lower portion of chamber 42. Venting of pressure from upper chamber 60, in the manner to be described below, will result in the valve returning to the state depicted in FIG. 1 under the influence of the pressurized operating fluid acting on the underside of spider 54 and the lower end of spool 24.

The state of pressurization of upper chamber 60 is a function of the state of energization of the actuator subassembly 12. With the actuator in the deenergized state as shown in FIG. 2, port 34 is in fluid communication with upper chamber 60 via a passageway 64 defined by apertures formed in coupling 30, housing 22, and nozzle plate 28. The flow passage in nozzle plate 28 includes an orifice 66 which provides communication between a blind transverse passage and a small valve chamber 68. The flow passage in nozzle plate 28 also includes an aperture 70 which extends from the chamber 68, at the downstream side of orifice 66, to upper chamber portion 60. The end of a plunger, indicated generally at 72, which forms part of the actuator extends into chamber 68 and is preferrably coaxial with orifice 66. The position of plunger 72 will be a function of the state of energization of a solenoid coil indicated generally at 90. The plunger 72 is, in the embodiment of FIGS. 1 and 2, of five-piece construction. Thus, plunger 72 comprises a pair of head portions 76 and 78 which are of increased diameter with respect to the remainder of the plunger. Head portion 76 will typically be integral with a post or rod 86 and will be provided with a recess which receives a sealing member 80 which may, for example, be comprised of rubber. The plunger will also be comprised of a sleeve member 84 which is provided with a blind hole for receiving post 86, the post being split at its upper end to insure insertion and capture in sleeve member 84. Sleeve member 84, at its upper end, is provided with a recess which receives a disc 82 of rubber or other similar resilient material. The head portion 78 is a split ring comprised of soft iron.

Plunger 72 is caused to reciprocate between the positions shown in FIGS. 1 and 2 by delivering current to or discontinuing the supply of current to the solenoid coil 90. Coil 90, in the disclosed embodiment, is wound on a frame 92 comprised of a suitable non-conducting material such as nylon. The solenoid coil and its supporting frame are positioned within a casing 94 which is formed of a suitable magnetic material. The frame 92 is provided with at least a first longitudinal slot, as indicated at 96, so that gas may flow, in the direction indicated by the arrows in FIG. 2, between plunger 72 and the solenoid coil.

The actuator subassembly also includes an upper housing extension 102 in which is received an insert 104. Insert 104 defines a vent port 100. A sealing ring 106 is provided to insure against gas leakage between insert 104 and housing 102. In the disclosed embodiment the vent port 102 tapers, in steps, to a nozzle 110 defined by a projection which cooperates with the disc 82 carried by plunger 72.

In operation, when the coil 90 is energized, head 78 is attracted to the casing 94 thus causing the plunger 72 to move from the position shown in FIG. 2 to that shown in FIG. 1. With the plunger in the FIG. 1 position the orifice 66 will be closed by sealing disc 80 and the source of pressurized operating fluid will thus be isolated from the upper chamber portion 60 and, accordingly, from upper side of diaphragm 52. Simultaneously, fluid in upper chamber portion 60 will be vented, via aperture 70, chamber 68, the slot or slots 96, the split (not shown) in ring 78, nozzle 110 and port 100. This relief of the pressure from the upper side of diaphragm 52 will result in the operating fluid acting on the end of spool 24 and the underside of plate 54 causing the valve spool to move to the FIG. 1 position wherein fluid communication between ports 36 and 38 is interrupted through the cooperation of sealing ring 50 with its associated valve seat. It will be recognized that, because of the closing of orifice 66, the only fluid which will be vented to the ambient atmosphere in the manner described above is that very minute quantity in upper chamber 60 and the passages downstream thereof, in the direction of port 100, at the time the solenoid is energized.

When the solenoid is deenergized, the fluid acting on disc 80, i.e., the fluid at the discharge end of orifice 66, will force plunger 72 to move from the FIG. 1 position to the FIG. 2 position whereupon the nozzle 110 will be sealed by disc 82 while fluid communication between port 34 and upper chamber portion 60 will be reestablished. Accordingly, since the diaphragm 52 functions as a differential area piston as noted above, the diaphragm will deflect and thus will move spool 24 from the position of FIG. 1 to that of FIG. 2. Accordingly, communication will be reestablished between ports 36 and 38 while communication between ports 34 and 36 will be interrupted. In one reduction to practice of the embodiment of FIGS. 1 and 2 the solenoid required to operate the pilot valve, i.e., to move the plunger 72, required only 0.08 watts with a five volt direct current source. This is a much lower power consumption when compared to prior art valves and permits direct operation of the valve of the present invention from low gain solid state electronics.

Figure 3:
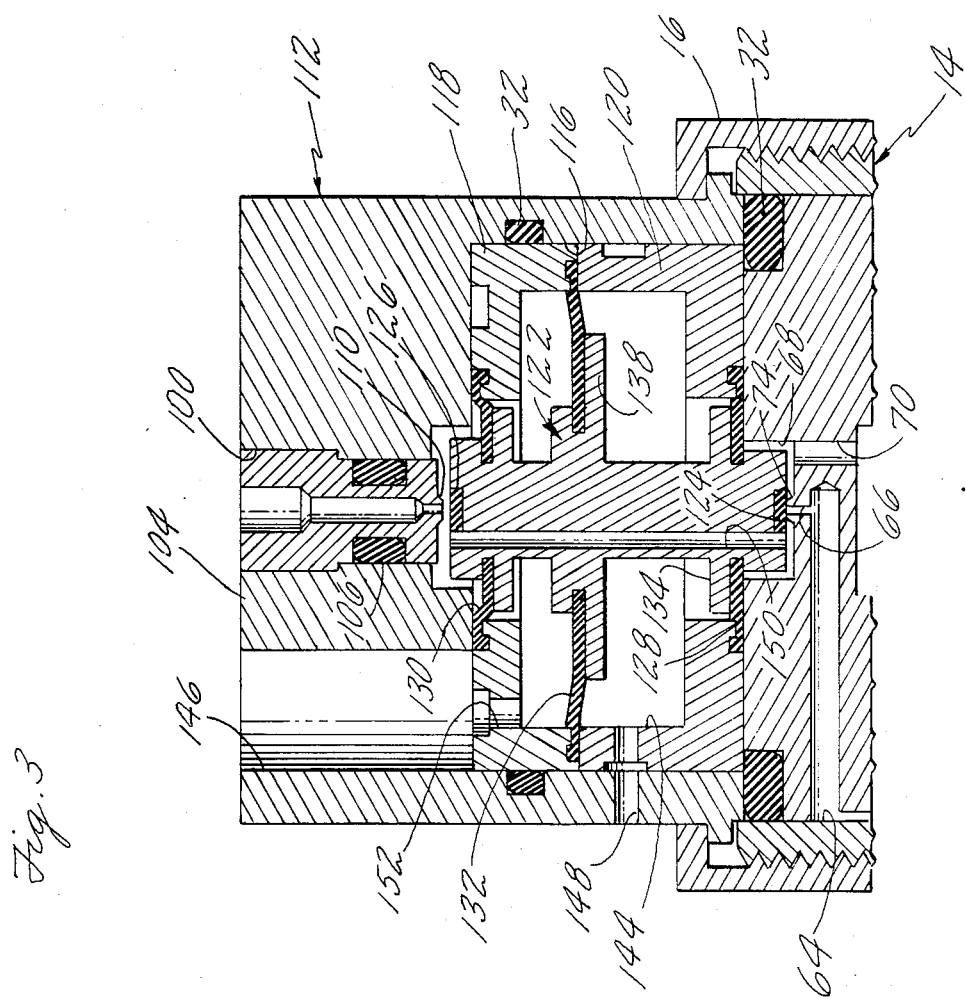
FIG. 3 is a cross-sectional view of a fluidic pilot valve which may be employed in place of the solenoid actuator of the valve of FIGS. 1 and 2.

Referring now to FIG. 3, a fluidically controlled pilot valve, which may be substituted for the solenoid operated pilot valve of the embodiment of FIGS. 1 and 2, is indicated generally at 112. The fluidic actuator 112 is attached to and cooperates with the main valve in the same manner as the previously described solenoid actuator. Accordingly, the main valve will not be described and it should suffice it to merely note that like reference numerals refer to like elements in FIG. 3 and in FIGS. 1 and 2.

The fluidic pilot valve 112 comprises an outer housing 104 which defines a recess 116. The recess 116 receives a pair of members 118 and 120 which cooperate to define a chamber 144. A plunger or poppet, indicated generally at 122, is disposed for movement in chamber 144 and is suspended by means of diaphragms 128, 130 and 132. Poppet 122 carries, at its upper end, a sealing disc 126 and, at its lower end, a sealing disc 124 which cooperates with orifice 66. The outer periphery of diaphragm 130 is captured, in the manner shown, between the upper chamber defining member 118 and housing 104. The diaphragm 132, which divides chamber 144 into upper and lower portions, is captured at its outer periphery between members 118 and 120. Upper diaphragm 132 is affixed, at its inner periphery, to a flange or spider which is shown as being integral with and extending from poppet 122. Lower diaphragm 132 is similarly affixed to a flange or spider 138 which is also shown as being integral with poppet 122. The third diaphragm 128 is captured, about its outer periphery, between the lower housing member 120 and the nozzle plate of the main valve. The inner periphery of diaphragm 128 is affixed to a flange or spider 134 which is also integral with poppet 122.

The lower portion of chamber 144, as defined by diaphragm 132, is in constant communication with the ambient atmosphere via a vent port 148. The chamber portion at the other side of diaphragm 132 is coupled to a source of control pressure, which is connected to a port 146 in the main housing 104, via an aperture 152 in upper housing member 118.

In operation, the poppet 122 is shifted between the position shown in FIG. 3 to the position therein disc 126 seals nozzle 110 and orifice 66 is opened to permit the pressurized operating fluid to act on the upper side of diaphragm 52 of the main valve. The movement of poppet 122 results from the selected application of control pressure at inlet port 146. With the control valve in the "energized" position of FIG. 3, the operating fluid will be vented from the upper chamber portion 60 of the main valve via aperture 70, chamber 68, a passage 150 in poppet 122 and nozzle 110. When the control pressure at port 146 is removed, the pressure of the operating fluid against sealing disc 124 will cause poppet 122 to move upwardly until nozzle 110 is sealed by disc 126 and the operating pressure is again applied, via orifice 66, to the upper side of main valve control diaphragm 52. The diaphragms 128 and 130 serve merely support poppet 122, to prevent leakage of operating fluid from either end of poppet 122 into chamber 144 and also to prevent the control fluid from leaking from the upper portion of chamber 144 to the vicinity of nozzle 110. The application of a very small control pressure at port 146 will be sufficient to move poppet 122 to the FIG. 3 position and hold it in this position whereby the main valve will move to the position depicted in FIG. 1.

A preferred embodiment of a solenoid operated valve in accordance with the present invention is shown in FIG. 4. The valve of FIG. 4 has a main valve housing 200 which defines an operating fluid inlet port 202, an exhaust or discharge port 204 and a two-way port 206. Housing 200 further defines an irregularly shaped chamber in which the main valve or poppet member 208 moves. This irregularly shaped chamber in housing 200 includes a pair of oppositely disposed valve seats 210 and 212 which cooperate with a sealing ring 214 mounted in an annular groove in, and thus carried by, poppet 208. The main or power diaphragm 216 is affixed to the upper end of poppet 208 and is partly supported by a spider 218 which is press fit on a reduced diameter section at the upper end of poppet 208. The outer periphery of diaphragm 216 is captured, in the manner shown, between a projection 220 on housing 200 and the nozzle plate defining member 222.

The nozzle plate defining member 222 corresponds to nozzle plate 28 of the embodiment of FIGS. 1 and 2 and thus defines an orifice 224 and an aperture 226 which provides communication between the downstream side of the orifice and the upper side of diaphragm 216. The orifice 224 and aperture 226 communicate via a chamber 228 which, in part, is defined by the housing of the solenoid operated pilot valve.

The actuator or pilot valve comprises a solenoid coil 230 which is wound on a frame, for example a nylon frame 232. Frame 232 is positioned within a casing 234 comprised of an appropriate magnetic material. In the disclosed embodiment the solenoid, including the coil and casing, is positioned within an aluminum shell 236 which is caused to engage valve housing 200 in the manner shown.

The actuator or pilot valve further includes a plunger, indicated generally at 240, which assumes a position determined by the state of energization of the solenoid coil 230. In the disclosed embodiment plunger 240 comprises a steel tube 242 having both ends thereof split. The lower end of this tube is collapsed and a brass "tack" 244 is inserted therein. The tack 244 has a recess in the head portion thereof which receives a sealing disc 246 which cooperates with the orifice 224 to perform a valving action. A rubber insert, having a head portion and a shank portion, is inserted in the upper, expanded end of tube 242 and, subsequently, a soft iron washer 250 is forced over the upper end of tube 242. The split in the upper end of tube 242 is indicated at 252.

The valve of FIG. 4 operates in substantially the same manner as the above-described embodiments of the invention. The solenoid coil 230 is normally deenergized and thus the valve will be in the condition shown in FIG. 4. In this position the venting of the operating fluid, which is acting on the upper side of diaphragm 216, will be prevented by virtue of the cap 248 sealing an exhaust port 254 in shell 236. When the solenoid coil is energized, and the washer 250 attracted against the casing 234, the orifice 224 will be closed and exhaust port 254 will be opened. With port 254 opened, fluid will be vented from the region at the upper side of diaphragm 216 via aperture 226, chamber 228, the clearance between tube 242 of plunger 240 and frame 232, the split 252 in tube 242 and port 254.

It is to be noted that the valve of FIG. 4 is provided with a pair of bayonnet type plugs 260 and 262 whereby the valve may be easily installed on a circuit board, the plugs 260 and 262 establishing both the electrical and mechanical connections to the board. Thus, the housing 220 will be provided with a pair of passages 264 and 266 by which the electrical connections to solenoid coil 230 will be made through plugs 260 and 262 respectively.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A flow controller comprising:

housing means, said housing means defining a plurality of ports accessible from the housing means exterior and a main valve chamber, said housing means also defining a first passage terminating in said main valve chamber and connecting a first of said ports to the main valve chamber, said housing means further defining a second passage terminating in said main valve chamber and connecting a second of said ports to the main valve chamber at a point displaced from the termination of said first passage, a first valve seat being disposed in said main valve chamber between the termination of said first and second passages, said housing means additionally defining a control chamber which communicates with said main valve chamber via a second valve seat, said housing means also defining a third passage connecting a third of said ports to said control chamber, said housing means further defining a third valve seat;

freely movable main valve means in part positioned in said housing means main valve chamber, said valve means being translated solely in response to applied fluidic pressure between a first position where it establishes a seal with said first seat and is displaced from said second seat and a second position where it establishes a seal with said second seat and is displaced from said first seat, said second and third ports being in fluid communication via said main valve chamber and control chamber with said main valve means in the first position and said first and second ports being in fluid communication via said main valve chamber when said main valve means is in the second position, said main valve means including an extension which projects through said second valve seat into said control chamber;

a diaphragm disposed in said control chamber and dividing said control chamber into a pair of chamber portions, a first of these control chamber portions being in communication with said main valve chamber via said second valve seat, said diaphragm being affixed to said main valve means extension; and means for selectively delivering a pressurized fluid to the second portion of said control chamber and for venting pressurized fluid from said second control chamber portion to cause the translation of said main valve means, said delivering and venting means comprising:

means defining a second valve chamber, said second valve chamber being in fluid communication with said control chamber;

pilot valve means, said pilot valve means having a movable valve member disposed in said second valve chamber;

means for supplying pressurized fluid to said second valve chamber, said supplying means including a fourth valve seat which cooperates with said pilot valve means valve member in the closed condition of said pilot valve means;

vent valve means having a movable valve member which cooperates with said third valve seat;

means defining a vent passage which provides fluid communication between said second valve chamber and said third valve seat; and solenoid means including a selectively energizable coil defining a central opening which extends between opposite sides of said coil and elongated plunger means, said plunger means being in part disposed in said central opening and being reiprocal between first and second positions, said plunger means extending from the said opposite sides of said coil and being at least in part comprised of magnetic material, said plunger means being connected at a first end thereof to said vent valve means movable valve member, the second end of said plunger means extending into said second valve chamber and being connected to said pilot valve means movable valve member whereby said vent valve means and pilot valve means may be operated simultaneously and in the opposite sense, the opening of said pilot valve means being commensurate with the closing of said vent valve means and the pressurization of said second control chamber portion, pressurization of said second control chamber portion causing movement of said main valve member to the said first position thereof in response to movement of said diaphragm, the closing of said pilot valve means causing the opening of said vent valve means and the venting of pressurized fluid from said control chamber second portion thereby permitting said main valve means to move from the said first position thereof to the second position thereof in response to the pressure in said main valve chamber, said plunger means being caused to reciprocate in a first direction in response to the controllable application of energy to said coil, said plunger means being caused to reciprocate in the opposite direction solely in response to pressurized fluid in said second valve chamber.

2. The flow controller of claim 1 wherein said means for supplying pressurized fluid to said second valve chamber includes a fourth passage in said housing means, said fourth passage connecting said fourth valve seat to said first passage.

3. The flow controller of claim 2 wherein said main valve means comprises:

an elongated poppet member, said poppet member defining a generally annular shaped seal receiving groove intermediate its length; and a ring seal mounted in said groove, said seal cooperating with said first and second valve seats.

4. The flow controller of claim 3 wherein said poppet member has an axis and is supported at a first end thereof from said diaphragm so as to be coaxial with at least a portion of said first passage, the second end of said poppet member extending through said first valve seat.

5. The flow controller of claim 4 wherein plunger means is elongated and is axially aligned with said poppet member.

6. The flow controller of claim 1 wherein said main valve means comprises:

an elongated poppet member, said poppet member defining a generally annular shaped seal receiving groove intermediate its length; and a ring seal mounted in said groove, said seal cooperating with said first and second valve seats.

7. The flow controller of claim 6 wherein said poppet member has an axis and is supported at a first end thereof from said diaphragm so as to be coaxial with at least a portion of said first passage, the second end of said poppet member extending through said first valve seat.

* * * * *